(12) United States Patent
Facemire et al.

(10) Patent No.: US 8,693,988 B2
(45) Date of Patent: Apr. 8, 2014

(54) SYSTEM, METHOD, AND APPARATUS FOR PROXIMITY-BASED AUTHENTICATION FOR MANAGING PERSONAL DATA

(75) Inventors: Michael D Facemire, Pittsboro, NC (US); Frank L Jania, Chapel Hill, NC (US); Tracy L Rankin, Raleigh, NC (US); Michael Wanderski, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1331 days.

(21) Appl. No.: 12/485,736

(22) Filed: Jun. 16, 2009

(65) Prior Publication Data

US 2010/0317323 A1    Dec. 16, 2010

(51) Int. Cl.
    *H04M 1/66*    (2006.01)
(52) U.S. Cl.
    USPC ..... 455/411; 455/456.1; 455/410; 455/414.2; 455/457; 455/556.1; 726/29

(58) Field of Classification Search
    USPC ........ 455/411, 456.1, 410, 414.2, 414.3, 457, 455/556.1
    See application file for complete search history.

(56) References Cited

U.S. PATENT DOCUMENTS

| 6,542,748 B2 * | 4/2003 | Hendrey et al. ............ 455/456.1 |
| 2005/0154904 A1 * | 7/2005 | Perepa et al. ................ 713/193 |
| 2006/0014532 A1 * | 1/2006 | Seligmann et al. .......... 455/420 |

* cited by examiner

*Primary Examiner* — Nimesh Patel
(74) *Attorney, Agent, or Firm* — Jeffrey T. Holman

(57) ABSTRACT

A computer program product that includes a computer useable storage medium to store a computer readable program for proximity-based authentication for managing personal data that, when executed on a computer, causes the computer to perform operations. The operations include receiving a request for personal data from a data access device, determining a first location corresponding to a location of the data access device, and determining a second location corresponding to a location of an authentication device. The operations also include transmitting the personal data to the data access device if the first location is within a threshold distance of the second location.

13 Claims, 6 Drawing Sheets

SYSTEM, METHOD, AND APPARATUS FOR PROXIMITY-BASED AUTHENTICATION FOR MANAGING PERSONAL DATA

BACKGROUND

Individuals frequently need to share their personal information with third parties. This information may include sensitive data such as Social Security numbers, healthcare information, etc. Typically, personal information is shared directly with the third party with the assumption that the third party is entitled to receive the information and will protect the information. Unfortunately, however, misuse and theft of personal information provided to third parties is becoming more and more common, resulting in significant harm to the individual who provided the personal information.

Additionally, the amount of personal and private information that a given individual must maintain is growing at a rapid pace, and it is becoming more and more difficult for individuals to manage the increasing volume of data. Various strategies have been developed for maintaining this ever-increasing volume, including mechanisms maintained by users to store the private information. These mechanisms do not solve the problem of information previously shared with a third party being accessed later without permission, nor do they provide any means of determining if the entity requesting information is entitled to receive the information.

SUMMARY

Embodiments of a computer program product are described. In one embodiment, the computer program product includes a computer useable storage medium to store a computer readable program for proximity-based authentication for managing personal data that, when executed on a computer, causes the computer to perform operations. The operations may include receiving a request for personal data from a data access device, determining a first location corresponding to a location of the data access device, and determining a second location corresponding to a location of an authentication device. The operations may also include transmitting the personal data to the data access device if the first location is within a threshold distance of the second location. Other embodiments of the computer program product are also described.

Embodiments of a system for proximity-based authentication for managing personal data are also described. In one embodiment, the system includes an access controller to manage access to personal data, a data access device coupled to the access controller to access the personal data, and a personal data store coupled to the access controller to store the personal data. In some embodiments, the access controller includes a request receiver to receive a request for the personal data from a data access device, a first location determiner to determine a first location corresponding to a location of the data access device, and a second location determiner to determine a second location corresponding to a location of an authentication device to authenticate the request for personal data. In one embodiment, the access controller includes a personal data transmitter to transmit the personal data to the data access device if the first location is within a threshold distance of the second location. The data access device, in one embodiment, includes a request transmitter to transmit the request for personal data to the access controller, and a personal data receiver to receive the personal data from the access controller. Other embodiments of the system are also described.

Embodiments of a computer-implemented method are also described. In one embodiment, the computer-implemented method is a method for proximity-based authentication for managing personal data. The method includes receiving a request for personal data from a data access device and accessing a data access device database associating the data access device with a first location corresponding to a location of the data access device. In some embodiments, the method also includes receiving second location data indicating a second location corresponding to a location of an authentication device, and transmitting the personal data to the data access device if the first location is within a threshold distance of the second location. Other embodiments of the computer-implemented method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In certain embodiments, an access controller determines if an authentication device, assigned to and in the possession of a personal data owner, is within a threshold distance of a data access device requesting personal data. By determining that the authentication device, and thus, the personal data owner, is close to the data access device, the access controller can infer that the personal data owner may be allowing access to the personal data. More importantly, the access controller can determine that if the authentication device is not close to the data access device, personal data should not be released to the data access device. Controlling the access to personal data by inferring proximity of the personal data owner to the data access device reduces the risk of unauthorized access to the personal data.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments determine a first location associated with a data access device and a second location associated with an authentication device. If the first location is within a threshold distance of the second location, personal data may be released to the data access device.

Figure 1:
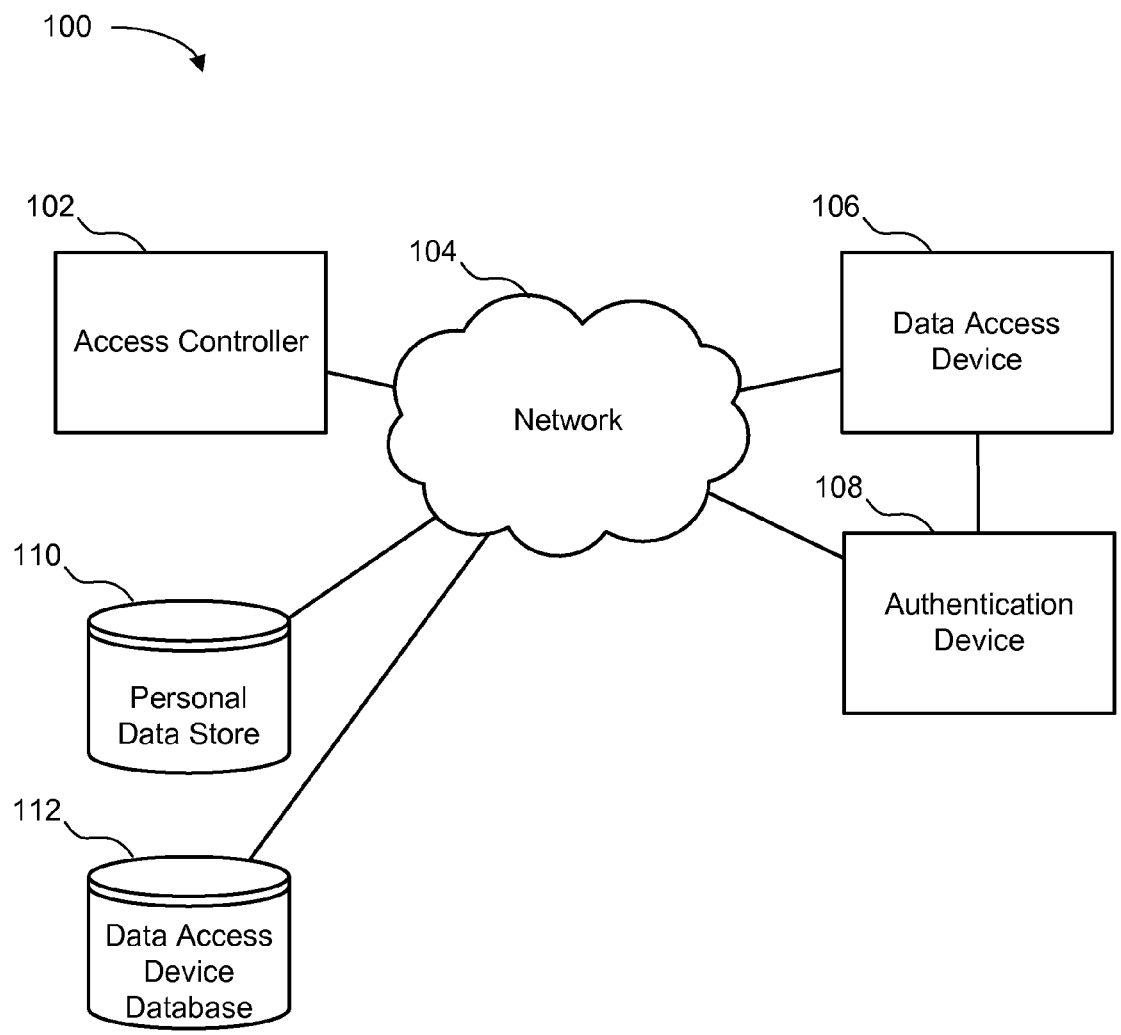
FIG. 1 depicts a schematic diagram of one embodiment of a system for proximity based authentication for managing personal data.

FIG. 1 depicts a schematic diagram of one embodiment of a system 100 for proximity based authentication for managing personal data. The system 100 includes an access controller 102, a network 104, a data access device 106, an authentication device 108, a personal data store 110, and a data access device database 112. The system 100 controls access to personal data by determining if the authentication device 108 is within a threshold distance of the data access device 106.

The access controller 102, in one embodiment, controls access to the personal data stored in the personal data store 110. The access controller 102 receives a request for personal data from the data access device 106 and determines if the authentication device 108 is within the threshold distance of the data access device 106. In certain embodiments, the access controller 102 transmits the personal data in response to determining that the authentication device 108 is within the threshold distance of the data access device 106.

In one embodiment, the access controller 102 is connected to a network 104. Other components of the system 100 may also be connected to the network 104 and communicate with the access controller 102 over the network 104. For example, the network 104 may be at least in part the Internet, and the access controller 102 may receive the request for personal data over the Internet. In another example, the network 104 may be at least in part a private network. In yet another embodiment, components of the system 100 may be directly linked to one another. For example, the personal data store 110 may be linked to the access controller 102.

The data access device 106, in one embodiment, requests personal data from the access controller 102. The data access device 106 communicates with the access controller 102 over the network 104, in one embodiment. For example, the data access device 106 may be connected to the Internet, and the request for personal data may be transmitted over the Internet to the access controller 102.

In some embodiments, the data access device 106 makes a request for personal data without communicating with the authentication device 108. In another embodiment, the data access device 106 communicates with the authentication device 108 to make the request for personal data. For example, the data access device 106 may be a computer with a Bluetooth interface, and the authentication device 108 may communicate a secure identifier to the data access device 106 over the Bluetooth interface for inclusion in the request for personal data.

The authentication device 108, in one embodiment, is a device assigned to the owner of the personal data. In certain embodiments, the authentication device 108 establishes the location of the personal data owner, and therefore should be in the possession of the personal data owner.

The authentication device 108 may be any type of device capable of establishing the location of the personal data owner. For example, the authentication device 108 may be a purpose-built device with a navigation satellite receiver that determines the position of the authentication device 108 using a navigation satellite system, such as the global positioning system (GPS). In another example, the authentication device 108 may include software and/or hardware that operates in conjunction with an existing device, such as a cell phone, to determine the location of the authentication device 108. Other examples of authentication devices 108 include, but are not limited to, smart cards, radio frequency identifiers (RFID), and implantable devices.

The personal data store 110, in one embodiment, is a data store that contains personal data. In certain embodiments, the personal data store 110 is organized into data items to indicate a type of data. For example, the personal data store 110 may be a database that stores and medical information about one or more individuals.

In one embodiment, the personal data store 110 is connected to the network 104. In this embodiment, the access controller 102 accesses the personal data in the personal data store 110 through the network 104. In an alternative embodiment, the personal data store 110 is connected to the access controller 102. For example, the access controller 102 may operate on a server (not shown) that includes the personal data store 110.

The data access device database 112, in one embodiment, is a database that associates one or more data access devices 106 with a location. For example, the data access device database 112 may indicate that the data access device 106 is located at a particular location.

In one embodiment, the data access device database 112 is connected to the network 104. For example, the access controller 102 may access the data access device database 112 over the network 104 to determine the location of the data access device 106.

Figure 2:
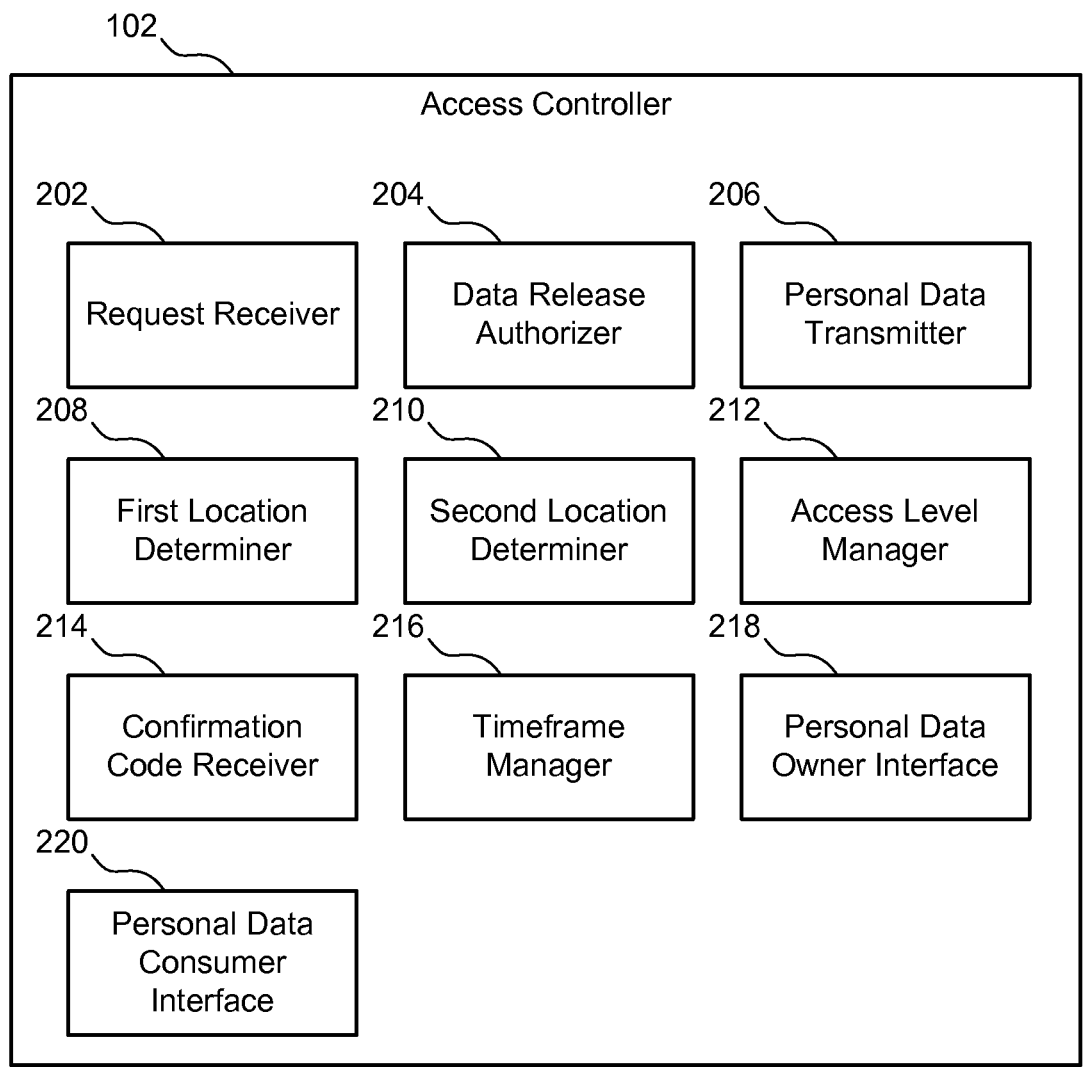
FIG. 2 depicts a schematic diagram of one embodiment of the access controller of FIG. 1.

FIG. 2 depicts a schematic diagram of one embodiment of the access controller 102 of FIG. 1. The access controller 102 includes a request receiver 202, a data release authorizer 204, a personal data transmitter 206, a first location determiner 208, a second location determiner 210, an access level manager 212, a confirmation code receiver 214, a timeframe manager 216, a personal data owner interface 218, and a personal data consumer interface 220. The access controller 102 controls access to the personal data stored in the personal data store 110.

The request receiver 202, in one embodiment, receives a request for personal data from the data access device 106. The request receiver 202 may include any type of interface for receiving the request, including, but not limited to, a data bus, a network interface, or a wireless interface. For example, the request receiver 202 may receive the request over an ethernet connection through an ethernet interface. The request receiver 202 makes the request available to other components of the access controller 102.

The data release authorizer 204, in certain embodiments, determines if the personal data should be released to the data access device 106. The data release authorizer 204 makes this determination based on characteristics of the request, characteristics of the requesting data access device 106, the output of other components of the access controller 102, and/or constraints placed upon the personal data. For example, the data release authorizer 204 may determine that the personal data should be released to the data access device 106 because the data access device 106 is near the location of the authentication device 108 and the personal data requested is consistent with a type of data that the data access device 106 is entitled to receive.

The personal data transmitter 206, in one embodiment, transmits the personal data to the data access device 106. In one embodiment, the personal data transmitter 206 transmits the personal data under the direction of the data release authorizer 204. For example, the personal data transmitter 206 may receive an input from the data release authorizer 204 authorizing transmission of personal data before transmitting the personal data. The personal data transmitter 206 may be any type of transmitter capable of transmitting the personal data, including, but not limited to, a data bus, a network interface, or a wireless interface.

In one embodiment, the first location determiner 208 determines the location of the data access device 106. The first location determiner 208 provides the location of the data access device 106 to other components of the access controller 102. For example, the first location determiner 208 may communicate the location of the data access device 106 to the data release authorizer 204.

In one embodiment, the first location determiner 208 accesses the data access device database 112 to retrieve location data corresponding to the data access device 106 to determine the location of the data access device 106. For example, the first location determiner 208 may receive information from the data access device database 112 that indicates a latitude and a longitude corresponding to the location of the data access device 106.

In another embodiment, the first location determiner 208 determines the location of the data access device 106 by receiving location data from the data access device 106. For example, in one embodiment, the data access device 106 includes a location sensor that senses location data indicating the location of the data access device 106. This location data is then made available to the first location determiner 208. In one embodiment, the location data is included with the personal data request delivered to the request receiver 202.

The second location determiner 210, in one embodiment, determines the location of the authentication device 108. The second location determiner 210 provides the location of the authentication device 108 to other components of the access controller 102. For example, the second location determiner 210 may communicate the location of authentication device 108 to the data release authorizer 204.

In some embodiments, the location determiner 210 receives location data corresponding to the location of the authentication device 108. In certain embodiments, the authentication device 108 includes a location sensor (not shown) that senses the location data corresponding to the location of the authentication device 108, and the authentication device 108 transmits this location data to the second location determiner 210. The location data may be received by the second location determiner 210 in conjunction with the request for personal data, or separate from the request for personal data. In some embodiments, the location data corresponding to the location of the authentication device 108 is transmitted through the data access device 106 to the second location determiner 210. In an alternative embodiment, the location data corresponding to the location of the authentication device 108 is transmitted to the second location determiner 210 independent of the data access device 106. For example, the location data corresponding to the location of the authentication device 108 may be transmitted by the authentication device 108 over a cellular telephone network to the second location determiner 210.

The access level manager 212, in one embodiment, manages one or more access levels for the personal data. An access level indicates a subset of personal data items that are available within the access level. Different access levels may allow access to different subsets of personal data items within the personal data.

In some embodiments, an access level is indicative of the trustworthiness of the requesting data access device 106. For example, a first access level may indicate a relatively high level of trust, and allow access to more data items then a second access level that indicates a relatively low level of trust. If the data access device 106 is highly trusted, it may be granted access to data within the first access level.

In another embodiment, an access level is indicative of the type of data. For example, personal data items available within one access level may include demographic information, while personal data items available within another access level may include medical information. In some embodiments, the data access device 106 has an associated access level that indicates the type of data which the data access device is permitted to access.

In one embodiment, the access level manager 212 responds to input by a personal data owner to manage an access level. For example, a personal data owner may request that a particular personal data item be excluded from an access level, and the access level manager 212 may respond to this request by removing the particular personal data item from the access level. In an alternative embodiment, the access level manager 212 responds to input by an administrator to manage an access level. For example, the access level manager 212 may add and/or remove personal data items from an access level as a result of an input by an administrator requesting a change to the access level.

In some embodiments, the access level manager 212 includes one or more default access level definitions that are applied to personal data absent input indicating changes to the default access levels. For example, the default access level definition for medical information may indicate that a particular set of personal data items relating to medical information be included within a medical information access level. In another embodiment, the access level manager 212 includes one or more default access level definitions customized for demographic data for a particular population. For example, in one embodiment, the access level manager 212 includes a default access level definition for personal data owners living in a particular geographic region. In another embodiment, the access level manager 212 may include a default access level definition by gender of the personal data owner.

The confirmation code receiver 214, in one embodiment, receives a confirmation code that authorizes release of personal data. In some embodiments, the confirmation code is input by the personal data owner and transmitted to the confirmation code receiver 214 and the access controller 102 releases the personal data after determining that the confirmation code is correct and the data access device 106 is within a threshold distance of the authentication device 108.

The timeframe manager 216 manages a length of time to allow access to personal data, in one embodiment. The timeframe manager 216 may determine a time to allow access subsequent to the data release authorizer 204 releasing the personal data, after which the data access device 106 is denied access to the personal data. For example, the timeframe manager 216 may permit access to the personal data for 30 minutes following an authorized request for personal data. After the 30 minutes have elapsed, the data access device 106 is denied continued access to the personal data until and unless the request is authenticated by the access controller 102 again.

In certain embodiments, the timeframe manager 216 responds to an input to define the length of time to allow access to the personal data. For example, a data access owner may choose a length of time to allow for continued access to his or her personal data. In some embodiments, the timeframe manager 216 has a default length of time to allow access to the personal data. In one embodiment, the default length of time may be modified by an input, such as from a user or an administrator.

The timeframe manager 216, in one embodiment, allows a different length of time to allow access for individual access levels. For example, an access level associated with medical data may allow access for two days, while an access level associated with demographic data may be accessible indefinitely.

In certain embodiments, the timeframe manager 216 associates a length of time to allow access with a data access device 106. For example, a particular data access device 106 may be granted access to personal data for 30 minutes. In another embodiment, a personal data owner may be prompted by the timeframe manger 216 to input a time to allow access to the personal data in conjunction with the request for personal data. For example, authorization of the request for personal data may be configured to include a confirmation code and a timeframe for continued access.

The personal data owner interface 218, in one embodiment, provides access to the access controller 102 for the personal data owner. The personal data owner interface 218 receives input from the personal data owner to modify settings for components of the access controller 102. For example, the personal data owner interface 218 may receive a timeframe from the personal data owner for continued access to the personal data and provide the timeframe to the timeframe manager 216.

The personal data owner interface 218 may be any type of interface capable of receiving input from a personal data owner. For example, the personal data owner interface 218 may be a web interface accessed by a web browser. In a further example, the personal data owner may log in to a web interface on a web browser operating on a cell phone to provide a confirmation code for the confirmation code receiver 214 for use in conjunction with a request for personal data.

The personal data consumer interface 220, in one embodiment, provides access to the access controller 102 for the personal data consumer. The personal data consumer interface 220 receives input from the personal data consumer to modify settings for components of the access controller 102. For example, the personal data consumer interface 220 may receive an input from the personal data consumer requesting that a particular data access device 106 be associated with a particular access level.

The personal data consumer interface 220 may be any type of interface capable of receiving input from a personal data consumer. For example, the personal data consumer interface 220 may be a web interface accessed by a web browser.

Figure 3:
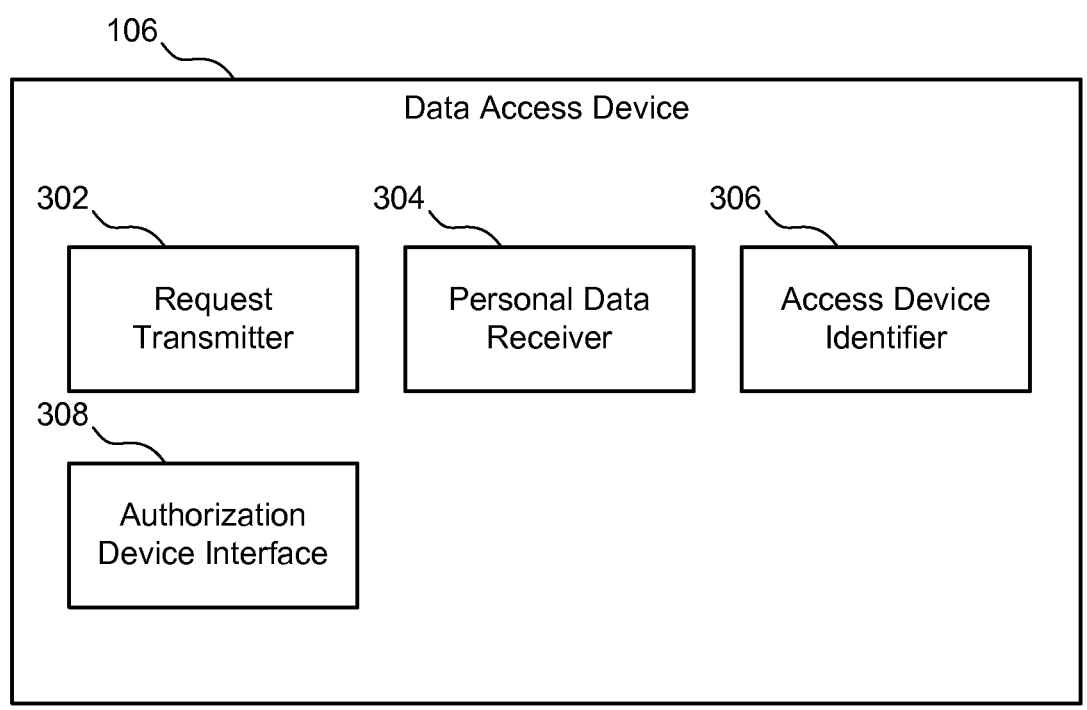
FIG. 3 depicts a schematic diagram of one embodiment of the data access device of FIG. 1.

FIG. 3 depicts a schematic diagram of one embodiment of the data access device 106 of FIG. 1. The data access device 106 includes a request transmitter 302, a personal data receiver 304, an access device identifier 306, and an authorization device interface 308. The data access device 106 requests and receives personal data.

In one embodiment, the request transmitter 302 transmits the request for personal data to the access controller 102. The request transmitter 302 may be any type of transmitter capable of transmitting the request. For example, the request transmitter 302 may include a modem that transmits the request for personal data over a telephone line. In another example, the request transmitter 302 may include a network adapter that transmits the request for personal data over the network 104.

The personal data receiver 304, in one embodiment, receives the requested personal data after the access controller 102 authorizes the request. The personal data receiver 304 may then provide the personal data to another device or application for use. For example, the personal data receiver 304 may transmit the personal data to a processor (not shown) which processes the personal data.

The personal data receiver 304 may be any type of receiver capable of receiving the personal data. For example, the personal data receiver 304 may include a modem that receives the personal data over a telephone line. In another example, the personal data receiver 304 may include a network adapter that receives the personal data over the network 104.

In certain embodiments, the request transmitter 302 and the personal data receiver 304 may operate the same device to perform their functions. For example, the request transmitter 302 and the personal data receiver 304 may operate a single modem which sends requests for the request transmitter 302 and receives personal data for the personal data receiver 304. In an alternative embodiment, the request transmitter 302 and the personal data receiver 304 operate a separate transmitter and receiver, respectively.

The access device identifier 306, in one embodiment, identifies the data access device 106. In one embodiment, the access device identifier 306 includes a serial number for the data access device 106. In some embodiments, the access device identifier 306 is transmitted to the access controller 102 to identify the requesting data access device 106. In certain embodiments, the access device identifier 306 includes a security feature. For example, the access device identifier 306 may include a digital signature that securely identifies the data access device 106. In some embodiments, the access device identifier 306 is encrypted.

In certain embodiments, the authorization device interface 308 provides an interface for communication with the authorization device 108. The authorization device interface 308 receives information from the authorization device 108 in conjunction with the request for personal data. For example, the authorization device interface 308 may receive a confirmation code from the authorization device 108 for transmission to the access controller 102. The authorization device interface 308 may be any type of interface capable of transmitting data from the authorization device 108 to the data access device 106. For example, the authorization device interface 308 may be a Bluetooth interface, an RFID interface, an optical interface, or the like.

Figure 4:
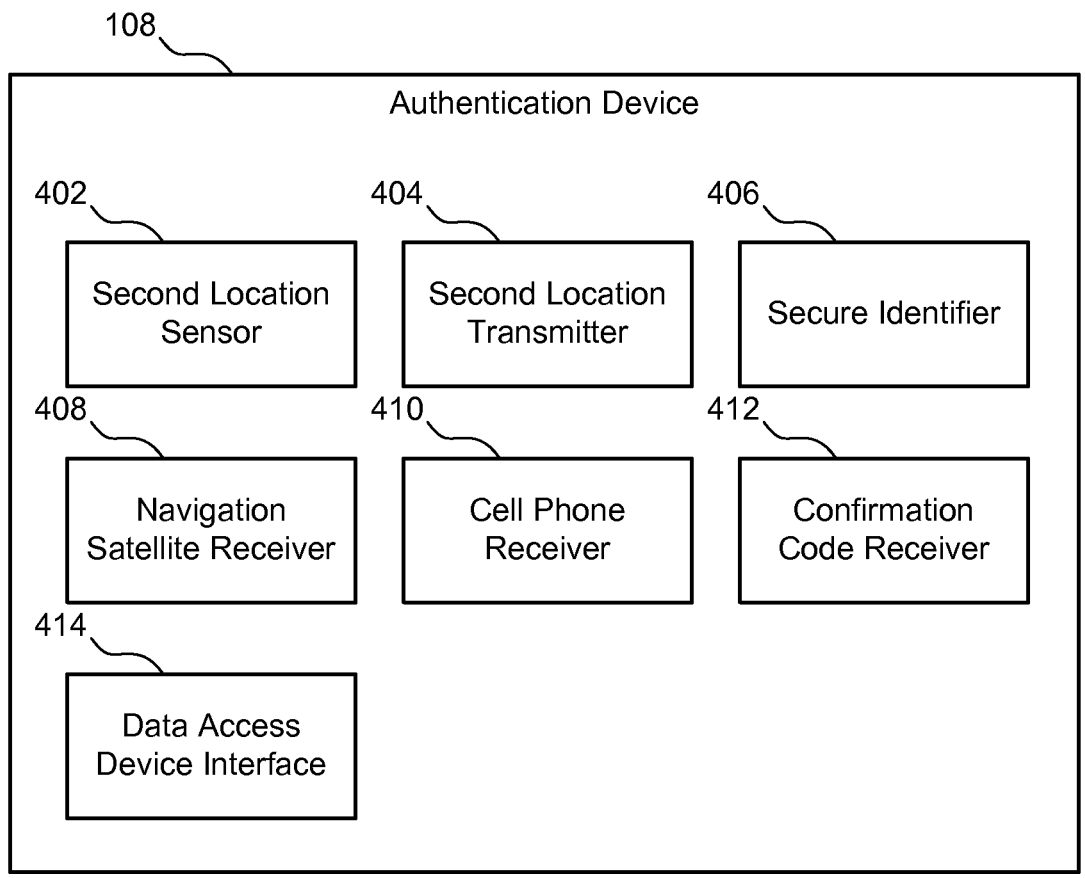
FIG. 4 depicts a schematic diagram of one embodiment of the authentication device of FIG. 1.

FIG. 4 depicts a schematic diagram of one embodiment of the authentication device 108 of FIG. 1. The authentication device 108 includes a second location sensor 402, a second location transmitter 404, a secure identifier 406, a navigation satellite receiver 408, a cell phone receiver 410, a confirmation code receiver 412, and a data access device interface 414. The authentication device 108 provides location data to the access controller 102 indicating the location of the authentication device 108.

The second location sensor 402, in one embodiment, senses second location data indicative of the location of the authentication device 108. In some embodiments, the second location sensor 402 uses the navigation satellite receiver 408 to sense the second location data. For example, the second location sensor 402 may determine second location data indicative of a latitude and a longitude of the authentication device 108 from a global positioning system (GPS). The second location sensor 402, in certain embodiments, accesses a navigation satellite receiver 408 and/or a cell phone receiver 410 to sense the second location data. In some embodiments, the second location sensor receives second location data from other sources, such as a ground based augmentation system, an inertial navigation system, or a terrestrial radio navigation system.

In one embodiment, the second location transmitter 404 transmits the second location data to the access controller 102. In certain embodiments, the second location transmitter 404 transmits the second location data independent of the data access device 106. For example, the second location transmitter may include a cell phone transmitter (not shown) which transmits the second location through a cell phone network. In another embodiment, the second location transmitter 404 transmits the second location data through the data access device 106. For example, the second location transmitter 404 may transmit the second location data to the data access device 106, which then transmits the second location data to the access controller 102.

The secure identifier 406, in one embodiment, identifies the authentication device 108. In some embodiments, the secure identifier 406 includes a security feature. For example, the secure identifier 406 may include a digital signature that securely identifies the authentication device 108. In some embodiments, the secure identifier 406 is encrypted. For example, in some embodiments, the secure identifier 406 uses a public key encryption system to encrypt the secure identifier 406.

In some embodiments, the navigation satellite receiver 408 senses a signal from a navigation satellite system (not shown) to determine location data indicative of the location of the authentication device 108. The navigation satellite receiver 408, in one embodiment, communicates the location data to the second location transmitter 404. Examples of navigation satellite systems that may be sensed by the navigation satellite receiver 408 include, but are not limited to, the Global Positioning System (GPS), the Global'naya Navigatsionnaya Sputnikovaya Sistema (GLONASS), the Beidou Satellite Navigation and Positioning System, the Compass navigation system, the Galileo positioning system, the Doppler Orbitography and Radio-positioning Integrated by Satellite (DORIS), the Indian Regional Navigational Satellite System (IRNSS), and the Quasi-Zenith Satellite System (QZSS).

In one embodiment, the cell phone receiver 410 senses cell phone tower data from one or more cell phone towers (not shown) to determine location data indicative of the location of the authentication device 108. As used herein, the term, "cell phone tower" refers to any type of site where antennas and electronic communications equipment are placed to create a cell in a network for mobile telephones. The cell phone receiver 410, in one embodiment, communicates the cell phone tower data to the second location transmitter 404. The cell phone receiver 410 may communicate with any type of cell phone tower on any type of mobile phone network. In some embodiments, the cell phone receiver 410 receives a signal from two or more cell phone towers having known locations and uses triangulation to infer the location of the authentication device 108. In another embodiment, the cell phone receiver 410 receives a signal from one cell phone tower and uses a known location of the cell phone tower to infer the location of the authentication device 108.

The confirmation code receiver 412, in one embodiment, receives a confirmation code from the personal data owner authorizing release of the personal data. In one embodiment, the confirmation code receiver 412 prompts the personal data owner for an input authorizing the release of personal data. In certain embodiments, the confirmation code receiver 412 communicates the confirmation code to the access controller 102. For example, in one embodiment, the authentication device 108 includes an input device (not shown) such as a numeric keypad, and the confirmation code receiver 412 receives a personal identification number (PIN) through the numeric keypad as a confirmation code.

In certain embodiments, the authentication device 108 includes the data access device interface 414 that communicates with the data access device 106. In some embodiments, the data access device interface 414 communicates authentication device information, such as, but not limited to, the secure identifier 406, the second location data, and/or the confirmation code. In another embodiment, the data access device interface 414 receives data access device information from the data access device 106, such as, but not limited to, a request for a confirmation code, and/or an access device identifier 306.

Figure 5:
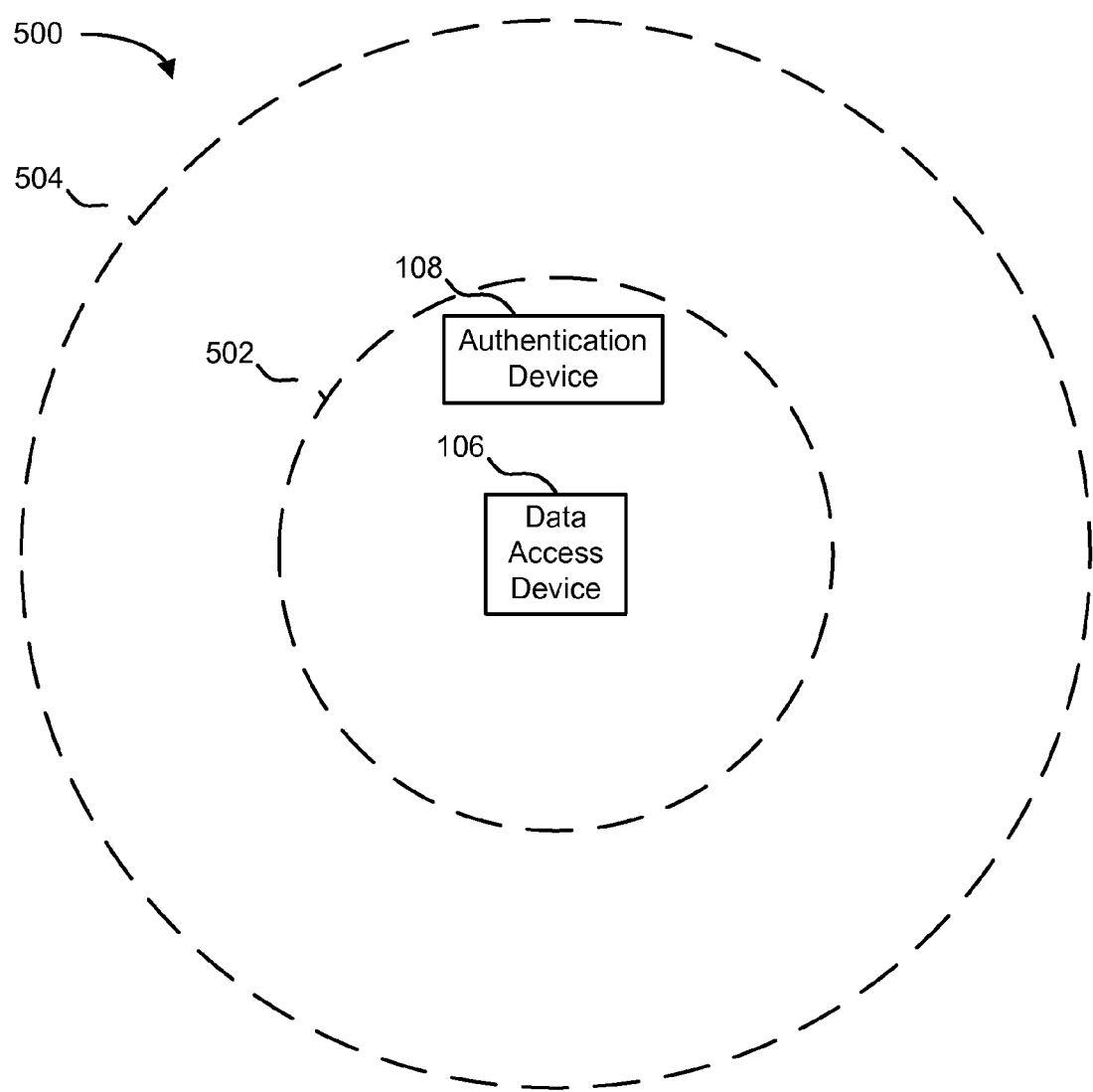
FIG. 5 depicts a schematic diagram of another embodiment of a system for proximity-based authentication for managing personal data.

FIG. 5 depicts a schematic diagram of another embodiment of a system 500 for proximity-based authentication for managing personal data. The system includes an authentication device 108 and a data access device 106. In certain embodiments, the system 500 determines if the authentication device 108 and the data access device 106 are within a threshold distance 502 of one another.

In one embodiment, the system 500 determines a location for both the data access device 106 and the authentication device 108. The system 500 compares these locations to determine if the authentication device 108 is within the threshold distance 502 of the data access device 106. By determining that the two devices 108, 106 are within the first threshold distance 502, the system 500 infers that the personal data owner is present at the data access device 106, and therefore may desire the release of personal data.

In some embodiments, the system 500 compares the locations of the data access device 106 and the authentication device 108 to determine if these locations are within a second threshold distance 504 of one another. The system 500 may respond to determining that the two devices 108, 106 are within the second threshold distance 504 of one another by granting access to personal data at a particular access level. For example, the second threshold distance 504 may be a relatively long distance, and the access level granted to a data access device 106 within the second threshold distance 504 of the authentication device 108 may include relatively little personal data, such as demographic data that does not individually identify the personal data owner. This type of threshold distance and access level may be useful in compiling demographic data.

In some embodiments, limited personal data provided to a data access device 106 within a second threshold distance 504 may be used to provide marketing opportunities for an operator of the data access device 106. For example, the operator of the data access device 106 may be a charity organization, and an authentication device 108 within the second threshold distance 504 of the data access device 106 may release contact information for the personal data owner. The charity organization in this example may then contact the personal data owner to provide information about an opportunity to interact with a charity organization close to the personal data owner that the personal data owner might otherwise have not known about.

Figure 6:
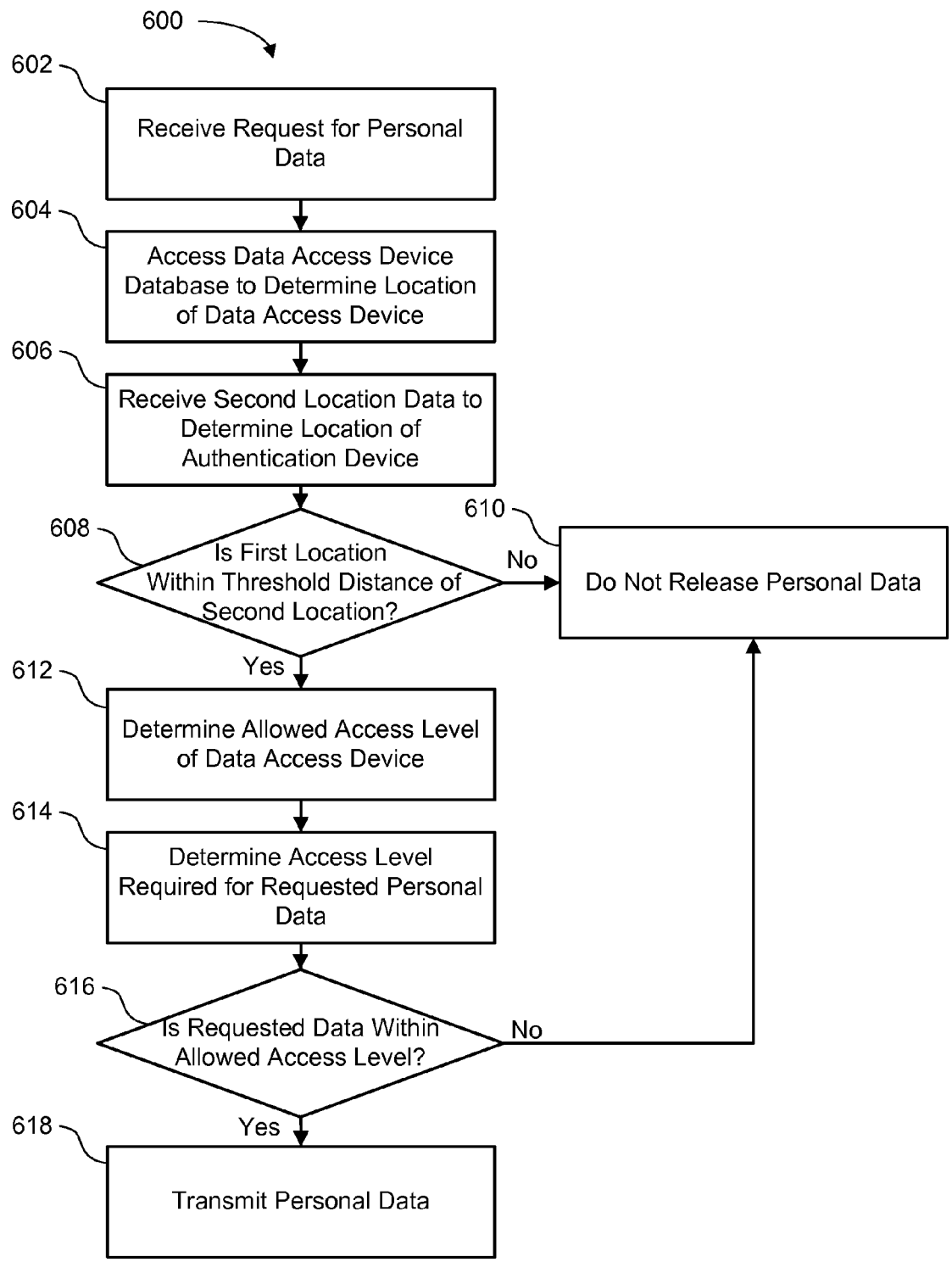
FIG. 6 is a flowchart diagram depicting one embodiment of a method for proximity-based authentication for managing personal data.

FIG. 6 is a flowchart diagram depicting one embodiment of a method 600 for proximity-based authentication for managing personal data. The method 600 is, in certain embodiments, a method of use of the systems and apparatuses of FIGS. 1-5, and is described with reference to those figures. Nevertheless, the method 600 may also be conducted independently thereof and is not intended to be limited to the specific embodiments discussed above with respect to those figures.

In the method 600, the request receiver 202 receives 602 a request for personal data. The request for personal data may be a request for any particular type of personal data, a subset of personal data, or a particular personal data item. In some embodiments, the received 602 request for personal data is a request for all available personal data.

In some embodiments, the first location determiner 208 accesses 604 a data access device database 112 to determine the location of the data access device 106. The data access device database 112 provides first location data indicative of the location of the data access device 106. In an alternative embodiment, the first location determiner 208 receives first location data indicative of the location of the data access device 106 from the data access device 106.

The second location determiner 210, in one embodiment, receives 606 second location data to determine the location of the authentication device 108. In one embodiment, the second location data is received 606 from the authentication device 108, which, in turn, senses the second location data using a second location sensor 402. In an alternative embodiment, the second location data 606 is received via the data access device 106 which, in turn, receives the second location data from the authentication device 108. In some embodiments, the second location data 606 is transmitted to the second location determiner 210 with the request for personal data.

The data release authorizer 204, in one embodiment, determines 608 if the first location is within a threshold distance 502 of the second location. The data release authorizer 204 infers from this determination if the data access device 106 is near enough to the authentication device 108 to allow a release of personal data. If the first location is not within the threshold distance of the second location, the data release authorizer 204 does not release 610 the personal data. If the first location is within the threshold distance of the second location, the data release authorizer 204 may release the personal data, or it may perform other determinations to determine if the personal data should be released.

The access level manager 212, in one embodiment, determines 612 the allowed access level of the data access device 106. In some embodiments, the access level manager determines 614 the access level required for the request of personal data. The data release authorizer 204 may compare 616 the allowed access level to the required access level to determine if the personal data should be released. If the requested data is not within the allowed access level, the data release authorizer 204 does not release 610 personal data. If the data release authorizer 204 determines that the requested data is within the allowed access level, the data release authorizer 204 may transmit 618 the personal data.

It should also be noted that at least some of the operations for the methods may be implemented using software instructions stored on a computer useable storage medium for execution by a computer. As an example, an embodiment of a computer program product includes a computer useable storage medium to store a computer readable program for proximity-based authentication for managing personal data that, when executed on a computer, causes the computer to perform operations. The operations may include receiving a request for personal data from a data access device, determining a first location corresponding to the location of the data access device, and determining a second location corresponding to the location of an authentication device. The operations may also include transmitting the personal data to the data access device if the first location is within a threshold distance of the second location.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program for proximity-based authentication for managing personal data wherein the computer readable program, when executed on a computer, causes the computer to perform operations comprising:

receiving, at an access controller, a request for personal data from a data access device of a requesting party, wherein the personal data belongs to a personal data owner, wherein the personal data does not belong to the requesting party, wherein the data access device comprises a request transmitter to transmit the request, wherein the data access device comprises a personal data receiver to receive the personal data;

maintaining a first access level and a second access level for the personal data, wherein the first access level permits access to a first subset of the personal data and the second access level permits access to a second subset of the personal data;

determining a first location corresponding to a location of the data access device;

determining a second location corresponding to a location of an authentication device; and transmitting the personal data to the data access device in response to determining that the first location is within a threshold distance of the second location and in response to receiving a confirmation code indicating that a personal data owner authorizes release of the personal data, wherein the confirmation code is separate and distinct from the second location data, wherein the confirmation code is input by the personal data owner.

2. The computer program product of claim 1, further comprising receiving navigation satellite system data for the authentication device to determine the second location.

3. The computer program product of claim 1, further comprising receiving cell phone tower data for the authentication device to determine the second location.

4. The computer program product of claim 1, further comprising:
assigning the first access level to the received request for personal data in response to determining that the data access device is entitled to access the first subset of the personal data; and
wherein transmitting the personal data to the data access device further comprises limiting the personal data transmitted to the data access device to the first subset of the personal data in response to assigning the first access level to the received request for personal data.

5. The computer program product of claim 4, further comprising receiving input from a personal data owner indicating one or more data items to be included in the first subset of the personal data.

6. The computer program product of claim 4, further comprising maintaining a data access device database associating the data access device with an allowed access level indicating allowed access to one or more data items, and wherein determining that the data access device is entitled to access the first subset of the personal data comprises comparing the allowed data access level to the first access level.

7. The computer program product of claim 4, further comprising establishing a default set of data items to be included in the first subset of the personal data.

8. The computer program product of claim 1, further comprising allowing continued access to the personal data by the data access device for a limited time.

9. A system for proximity-based authentication for managing personal data, the system comprising:
an access controller to manage access to personal data, the access controller comprising;
a request receiver to receive a request for the personal data from a data access device of a requesting party, wherein the data belongs to a personal data owner, wherein the personal data does not belong to the requesting party;
a first location determiner to determine a first location corresponding to a location of the data access device;
a second location determiner to determine a second location corresponding to a location of an authentication device to authenticate the request for personal data; and
a personal data transmitter to transmit the personal data to the data access device in response to determining that the first location is within a threshold distance of the second location and in response to receiving a confirmation code indicating that a personal data owner authorizes release of the personal data, wherein the confirmation code is separate and distinct from the second location data, wherein the confirmation code is input by the personal data owner;
the data access device coupled to the access controller to access the personal data, the data access device comprising:
a request transmitter to transmit the request for personal data to the access controller; and
a personal data receiver to receive the personal data from the access controller; and
a personal data store coupled to the access controller to store the personal data, wherein the personal data store maintains a first access level and a second access level for the personal data, wherein the first access level permits access to a first subset of the personal data and the second access level permits access to a second subset of the personal data.

10. The system of claim 9, wherein the authentication device is coupled to the access controller and comprises:
a second location sensor to sense location data corresponding to the location of the authentication device;
a second location transmitter to transmit the location data to the access controller; and
a secure identifier to establish the identity of the authentication device.

11. The system of claim 10, wherein:
the authentication device further comprises a data access device interface to communicate with the data access device;
the authentication device transmits the secure identifier to the data access device; and
the request for personal data from the data access device comprises the secure identifier.

12. The system of claim 10, wherein the authentication device further comprises a navigation satellite receiver to receive navigation satellite system data, and wherein the navigation satellite system data is transmitted to the access controller to determine the second location.

13. The system of claim 10, wherein the authentication device further comprises a cell phone receiver to receive cell phone tower data, and wherein the cell phone tower data is transmitted to the access controller to determine the second location.

* * * * *